United States Patent
Lin et al.

(10) Patent No.: US 9,653,216 B2
(45) Date of Patent: May 16, 2017

(54) SEALING ELEMENT AND WOUND-TYPE SOLID STATE ELECTROLYTIC CAPACITOR THEREOF

(71) Applicant: APAQ TECHNOLOGY CO., LTD., Miaoli County (TW)

(72) Inventors: Ching-Feng Lin, Hsinchu County (TW); Ming-Tsung Chen, Changhua County (TW)

(73) Assignee: APAQ TECHNOLOGY CO., LTD., Miaoli County (TW)

( * ) Notice: Subject to any disclaimer, the term of this patent is extended or adjusted under 35 U.S.C. 154(b) by 77 days.

(21) Appl. No.: 14/594,602

(22) Filed: Jan. 12, 2015

(65) Prior Publication Data
US 2016/0118196 A1 Apr. 28, 2016

(30) Foreign Application Priority Data
Oct. 28, 2014 (TW) ............... 103137180 A

(51) Int. Cl.
*H01G 9/10* (2006.01)
*H01G 9/15* (2006.01)

(52) U.S. Cl.
CPC ............ *H01G 9/10* (2013.01); *H01G 9/151* (2013.01)

(58) Field of Classification Search
CPC ................... H01G 9/10; H01G 9/151
See application file for complete search history.

(56) References Cited

U.S. PATENT DOCUMENTS

| 3,439,233 | A * | 4/1969 | Braiman | H01G 2/04 174/138 G |
| 4,868,717 | A * | 9/1989 | Tyler | H01G 9/10 361/519 |
| 6,711,000 | B2 * | 3/2004 | Takeishi | H01G 9/0003 29/25.03 |
| 2016/0093450 | A1 * | 3/2016 | Kuroki | H01G 11/18 361/502 |

FOREIGN PATENT DOCUMENTS

| JP | 02276225 A | * | 11/1990 | |
| JP | 03058406 A | * | 3/1991 | |
| JP | 03068125 A | * | 3/1991 | |
| JP | 03232214 A | * | 10/1991 | |
| JP | 05021292 A | * | 1/1993 | |
| JP | WO 2014199639 A1 | * | 12/2014 | ............. H01G 11/18 |

* cited by examiner

*Primary Examiner* — David M Sinclair
(74) *Attorney, Agent, or Firm* — Li & Cai Intellectual Property (USA) Office

(57) ABSTRACT

A sealing element of the instant disclosure includes a cover body, an exterior convex portion, and an interior convex portion. The cover body has a first surface, a second surface arranged opposite to the first surface, and a pair of terminal holes formed on the cover body and extending through the first and second surfaces. The exterior convex portion has at least one first abutting surface arranged on the first surface of the cover body and an expansion space formed concavely in the exterior convex portion. The interior convex portion has at least one second abutting surface arranged on the second surface of the cover body. Specifically, the sealing element is configured to prevent the capacitor element from swaying, so that the electrical property of the wound-type solid state electrolytic capacitor with the sealing element can be improved.

8 Claims, 8 Drawing Sheets

SEALING ELEMENT AND WOUND-TYPE SOLID STATE ELECTROLYTIC CAPACITOR THEREOF

BACKGROUND OF THE INVENTION

1. Field of the Invention

The instant disclosure relates to a sealing element and wound-type solid state electrolytic capacitor thereof; in particular, to a sealing element and wound-type solid state electrolytic capacitor therefor for acoustics

2. Description of Related Art

For acoustics components, capacitors are widely used for filtering, decoupling, high-frequency compensation, and providing direct feedback. Depending on the structure and manufacturing process, capacitors can be divided into a variety of classes. Specifically in audio systems, since characteristics such as large frequency response and current are required, thus, aluminum electrolytic capacitors are most widely used.

As shown in FIG. 12, the conventional wound-type solid state electrolyte capacitor comprises a capacitor casing 1, a capacitor element 2, and the sealing member 3. One end of the capacitor casing has an open end, the sealing element 3 is disposed in the open end and forms a hermetic seal with the open end, so that the capacitor element 2 remains inside the capacitor casing 1. Capacitor element 2 is connected to two terminals 4 and is soldered to the circuit board via the two terminals 4.

The capacitor element 2 is an anode foil wound together with a cathode foil, and an electrolyte layer is formed between the anode foil and the cathode foil. The anode foil and the cathode foil of the capacitor element are dielectric layers made from oxidized metal thin films, or by depositing insulating polymer materials, via vapor deposition, onto the conductive layer. The anode foil and the cathode foil have a dielectric thin film or an insulating thin film therebetween, so that insulation is formed between the anode foil and the cathode foil of the capacitor.

Typical capacitors are reflow-soldered onto the circuit board. During soldering, the capacitor must pass through a high heat soldering furnace, thus, the capacitor must also endure high temperatures. Since the capacitor casing 1 is a closed-off environment and the encapsulated capacitor element 2 is impregnated with electrolytes and polymer material for establishing insulation, heated electrolytes or polymer material may become volatile gases that can build up pressure inside the capacitor casing 1, and the capacitor element 2 and the sealing element 3 inside the capacitor casing 1 might undergo stress and deformation due to the buildup of internal pressure.

When the capacitor element 2 undergoes thermal deformation, if the element is compressed onto the inside surface of the sealing element 3, the capacitor element will undergo stress due to deformation that may damage the insulation layer or dielectric layer of the capacitor element 2, and may result in current leakage. On the other hand, the hermetic seal between sealing element 3 and capacitor casing 1 maybe be destroyed due to compression by the capacitor element 2, such that moisture or other impurities may enter the capacitor casing, which can damage the insulation of the capacitor element 2.

Conventionally, in order to prevent the thermal deforming capacitor element 2 from compressing the surface of the sealing element 3, a gap is typically maintained between the capacitor element 2 and the sealing element. However, the gap tends to allow the capacitor element 2 to sway within the capacitor casing 1, which can lead to changes in electrical characteristics of the capacitor element, such as stability of current and impedance.

Furthermore, when the capacitor is soldered to the circuit board, the two terminals of the capacitor 4 are installed on the circuit board in the direction of one end of the sealing element 3, whereas the terminals 4 of the capacitor and the circuit board are connected by soldering. In the conventional capacitor structure, since the end surface of the sealing element 3 is planar, when the end is installed onto the circuit board, the end surface of the sealing element 3 may have direct contact with the outer surface of the circuit board. As such, problems might surface such as (1) during soldering the capacitor, internal pressure of the capacitor case might increase as the temperature rises within, the sealing member 3 might be pressed outwards, so that the end surface of the sealing element 3 is pressed against the circuit board, which can result in deformation to the circuit board or damages to capacitor terminals; (2) the end surface of the sealing element 3 makes contact with the outer surface of the circuit board, which eliminates any room for gases generated to flow when the capacitor terminals 4 are soldered to the circuit board. At the same time, soldering may generate capillary action due to the gap between the end surface of the sealing element and the circuit board 3 to be too small that can cause unintended solder flow and in turn result in soldering defects at the capacitor terminals 4.

For these reasons, the conventional wound-type solid state electrolyte capacitor has a considerable amount of operational defects. With improvements in structural design, the method to overcome these defects, which can reduce the adverse effects of a wound-type solid state electrolyte capacitor due to the high soldering temperature during soldering, has become an important subject to be resolved.

To address the above issues, the inventor strives via associated experience and research to present the instant disclosure, which can effectively improve the limitation described above.

SUMMARY OF THE INVENTION

The objective of the instant disclosure is to provide a sealing element and wound-type solid state electrolytic capacitor thereof.

In order to achieve the aforementioned objectives, according to an embodiment of the instant disclosure, a sealing element is provided to be disposed at an open end of a capacitor casing and to form a hermetic seal with the capacitor casing in order to retain a capacitor element in the capacitor casing. The sealing element comprises: a cover body having a first surface exposed from the capacitor casing and a second surface oppositely arranged from the capacitor element, and the cover body having a pair of terminal holes extending through the first surface and the second surface; an exterior convex portion arranged on the first surface of the cover body, and the exterior convex portion having a first abutting surface arranged at an apex thereof and at least one expansion space; and an interior convex portion arranged on the second surface of the cover body to interface with the capacitor element, and the interior convex portion having a second abutting surface arranged at an apex thereof, and the second abutting surface partially in contact with a surface of the corresponding capacitor element.

In order to achieve the aforementioned objectives, according to another embodiment of the instant disclosure, a wound-type solid state electrolytic capacitor is provided, which comprises: a capacitor casing having an open end; capacitor element disposed in the capacitor casing; and a sealing element arranged at the open end of the capacitor casing and forming a hermetic seal with the capacitor casing. The sealing element includes a cover body, an exterior convex portion, and an interior convex portion. The cover body has a first surface exposed from the capacitor casing and a second surface oppositely arranged from the capacitor element. The cover body has a pair of terminal holes extending through the first surface and the second surface. The exterior convex portion is arranged on the first surface of the cover body, and the exterior convex portion has a first abutting surface arranged at an apex thereof and at least one expansion space. The interior convex portion is arranged on the second surface of the cover body to interface with the capacitor element, and the interior convex portion has a second abutting surface arranged at an apex thereof. The second abutting surface is partially in contact with a surface of the corresponding capacitor element.

The present disclosure has at least the following improvements: The present disclosure provides the exterior convex portion of the sealing element can absorb the stress by the deformation of the sealing element, such that the sealing element, the outer surface of the circuit board, and the capacitor terminals mutually maintain a certain distance from each other, while room is provided to allow air flow for gases generated during soldering and welding in order to improve soldering quality.

Furthermore, the present disclosure provides a gap between the sealing element and the capacitor element by having the interior convex portion on the second surface of the sealing element partially in contact with the corresponding outer surface of the capacitor element in order to prevent damage on the insulation layer of the capacitor element due to the compression between the thermal deformable capacitor element and the second surface of the sealing element that may further lead to current leakage. At the same time, with the physical interference between the second abutment surface and the capacitor element, the capacitor element may be kept from swaying, which can enhance the stability of the electrical characteristics of the capacitor element.

In order to further understand the instant disclosure, the following embodiments and illustrations are provided. However, the detailed description and drawings are merely illustrative of the disclosure, rather than limiting the scope being defined by the appended claims and equivalents thereof.

DETAILED DESCRIPTION OF THE PREFERRED EMBODIMENTS

The aforementioned illustrations and detailed descriptions are exemplarity for the purpose of further explaining the scope of the instant disclosure. Other objectives and advantages related to the instant disclosure will be illustrated in the subsequent descriptions and appended drawings.

[First Embodiment]

Figure 1:
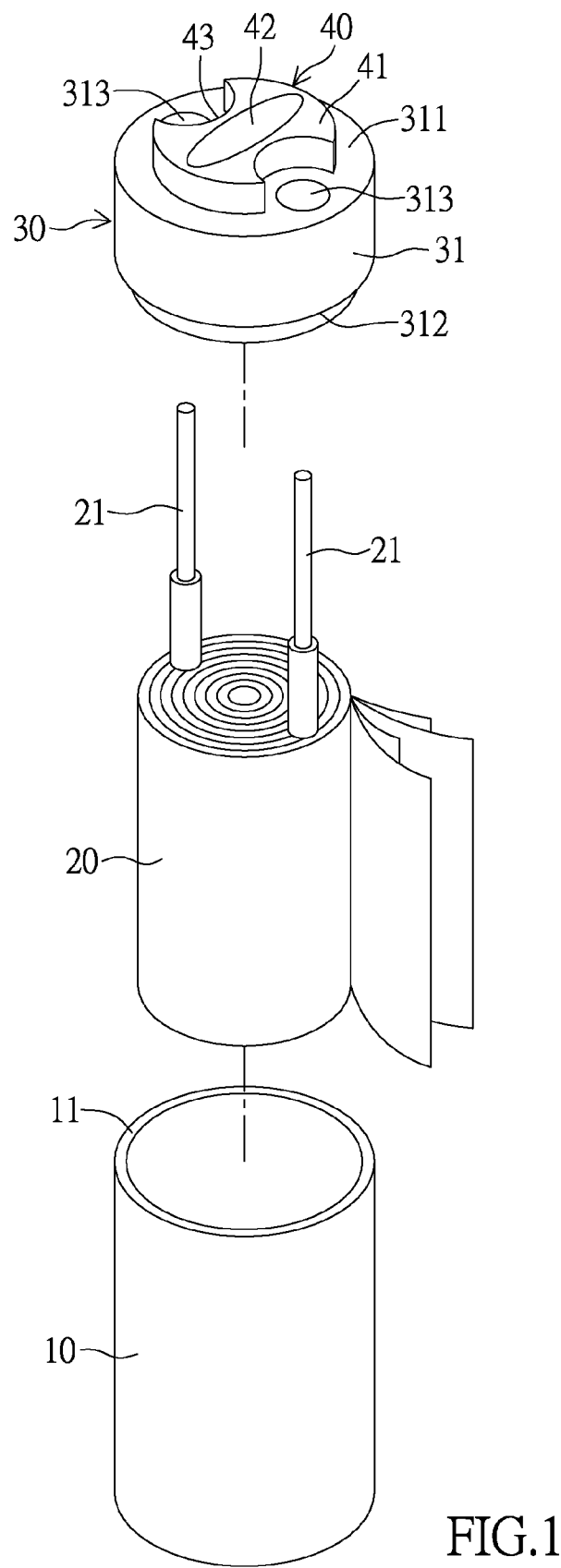
FIG. 1 is an exploded view of a sealing element and wound-type solid state electrolytic capacitor thereof in accordance with a first embodiment of the instant disclosure.
Figure 2:
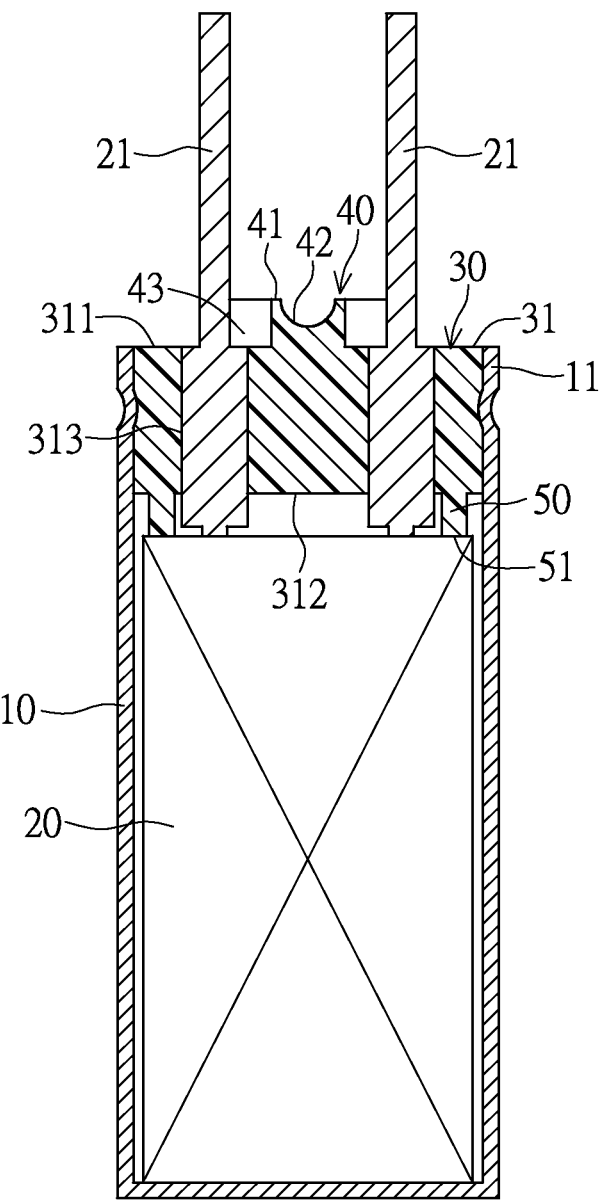
FIG. 2 is a cross-sectional view of the assembled sealing element and wound-type solid state electrolytic capacitor thereof in accordance with the first embodiment of the instant disclosure.
Figure 3:
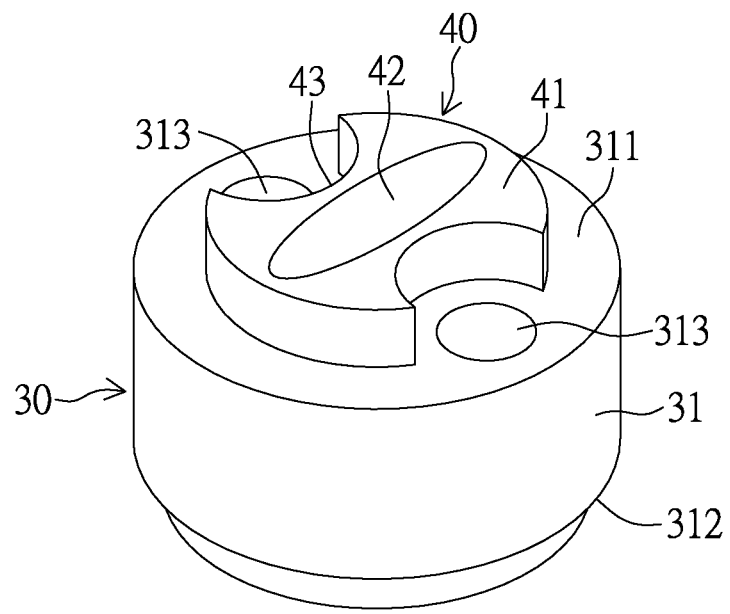
FIG. 3 is a perspective view of the sealing element in accordance with the first embodiment of the instant disclosure.

Please refer to FIGS. 1 and 2 as a structural illustration of a wound-type solid state electrolytic capacitor of a sealing element in accordance with the instant embodiment. The sealing element includes a capacitor casing 10, a capacitor element 20, and a sealing element 30. The capacitor casing 10 is a casing having a sealed end and an open end 11. The capacitor element 20 is arranged in the capacitor casing 10, the capacitor element 20 is formed by wounding anode foil and cathode foil together, and the capacitor element further has two terminals 21. The sealing element 30 is arranged at the open end 11 of the capacitor casing 10, and provides excellent hermetic sealing with the capacitor casing 10 in order to group the capacitor element 20 in the capacitor element 10, prevent moisture from entering the interior of the capacitor casing 10, and maintain insulation between the anode foil and the cathode foil of the capacitor element 20.

As shown in FIGS. 3 to 6, the sealing element 30 is made of elastic materials such as rubber or plastic, etc. The sealing element 30 includes a cover body 31, an exterior convex portion 40, and an interior convex portion 50 separately arranged on two sides of the cover body 31. The cover body 31 in the instant embodiment is a cylindrically shaped body. The cover body 31 has a first surface 311 exposed from the capacitor casing 10 near the brim and at the open end 11 of the capacitor casing 10 and a second surface 312 facing the interior of the capacitor casing 10 as well as oppositely arranged from the capacitor element 20. The cover body 31 has a pair of terminal holes 313 arranged thereon. The terminal holes 313 penetrate through both the first surface 311 and the second surface 312 so that two terminals 21 of the capacitor element 20 can pass through and extend out of the sealing element 30.

Figure 7:
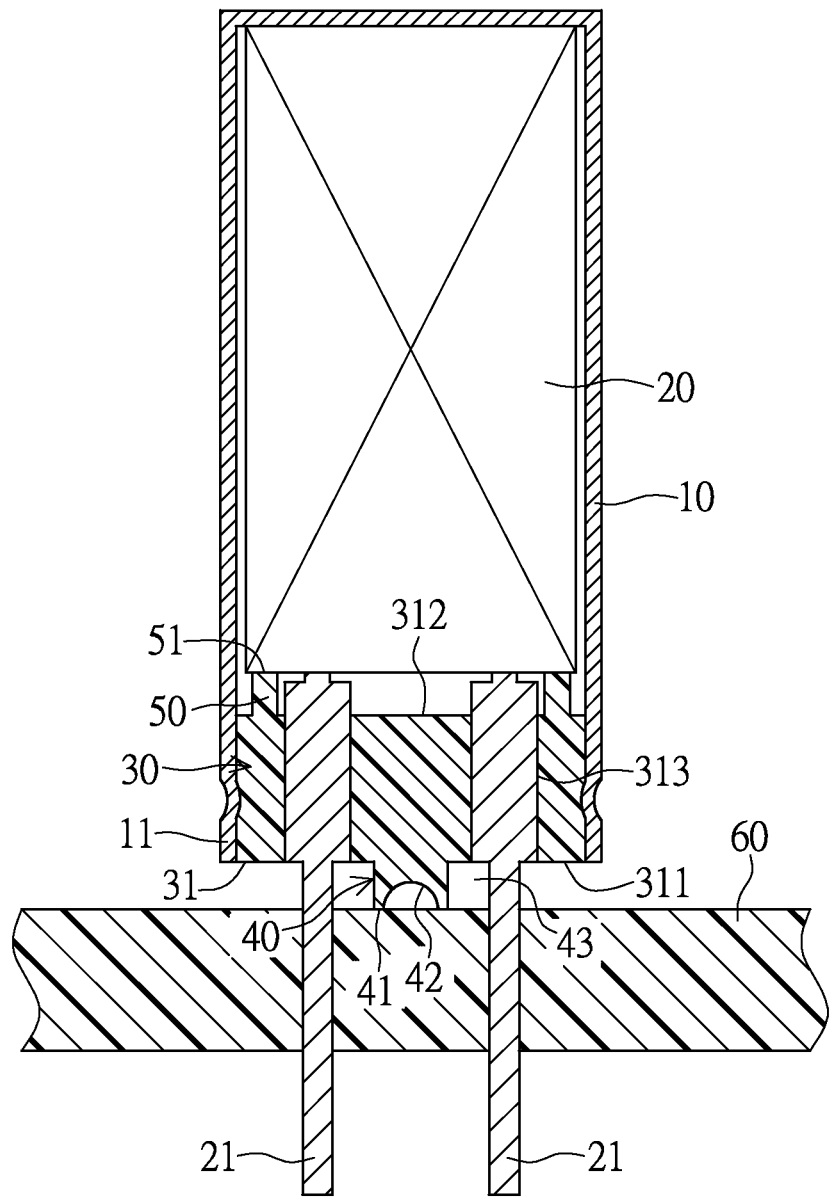
FIG. 7 is a schematic diagram illustrating a wound-type solid state electrolytic capacitor of the sealing element installed on a circuit board in accordance with the instant disclosure.

The exterior convex portion 40 is arranged on the first surface 311 of the cover body 31. The exterior convex portion 40 is a protrusion in the instant embodiment and is arranged between the two terminal holes 313. The exterior convex portion 40 extends from the first surface 311 towards a direction away from the first surface 311. The exterior convex portion 40 has a first abutting surface 41 arranged on the apex of the exterior convex portion 40. The first abutting surface 41 and the first surface 311 of the cover body 31 are kept at a distance apart from each other. As shown in FIG. 7, when the wound-type solid state electrolytic capacitor is inserted onto a circuit board 60, the first surface 311 of the sealing member 30 and the circuit board 60 maintain a predetermined distance therebetween due to the first abutting surface 41 of the exterior convex portion 40 that is abutted against the outer surface of the circuit board 60.

The exterior convex portion 40 further includes a slot 42, the slot 42 is concaved and is arranged on the first abutting surface 41. The slot 42 defines an expansion space therein to accommodate the relatively large elastic deformation of the exterior convex portion 40, so that when the capacitor is being soldered, if any pressure buildup inside the capacitor casing 10 outwardly pushes and generates outward deformation on the sealing member 30, the expansion space 42 can buffer the exterior convex portion 40 and the exterior convex portion 40 can absorb the stress applied on the sealing member 30.

Two lateral portions of the exterior convex portion 40 near the terminal holes 313 each have a notch arranged thereon, so that the two lateral portions of the exterior convex portion 40, the two terminal holes 313, and two terminals 21 are spaced apart by a gap. With the two notches 43, a flow channel between the two lateral portions of the exterior convex portion 40 and the two terminals 21 is maintained for gas flow generated during soldering or welding. As shown in FIG. 7, with the positioning of the exterior convex portion 40, the first surface 311 of the sealing member 30 and the circuit board 60 maintains a gap therebetween when the wound-type solid state electrolytic capacitor of the instant disclosure is soldered onto the circuit board 60. Meanwhile, with the gap maintained between the notch 43 and the two terminals 21, when the two terminals 21 are being soldered onto the circuit board 60, the point at which the terminal 21 and the circuit board 60 are soldered will not be in contact with the first surface 311 of the sealing member 31 and side surface of the exterior convex portion 40. As a result, the integrity of the shape of the solder ball that is located at the point where the terminal 21 and the circuit board 60 are soldered is maintained. Moreover, the gas generated by the soldering materials, flux, and related soldering materials can be ventilated through the channel between the exterior convex portion 40 and the terminal 21, thus, helping to enhance the quality of soldering.

Figure 4:
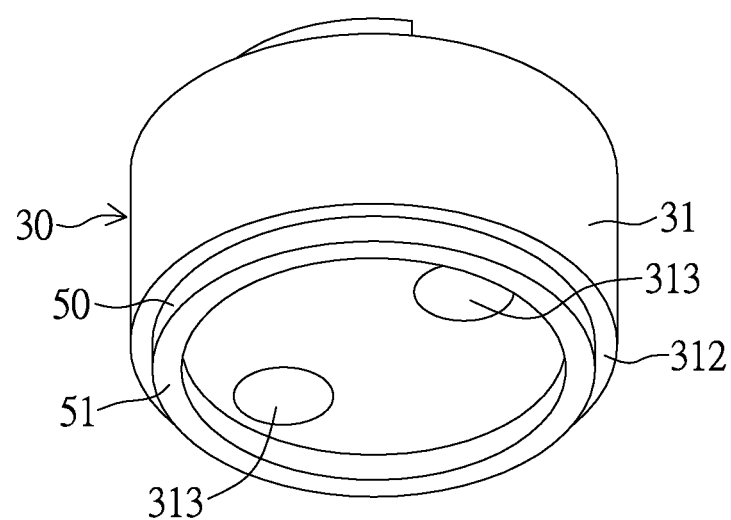
FIG. 4 is another perspective view of the sealing element in accordance with the first embodiment of the instant disclosure.
Figure 5:
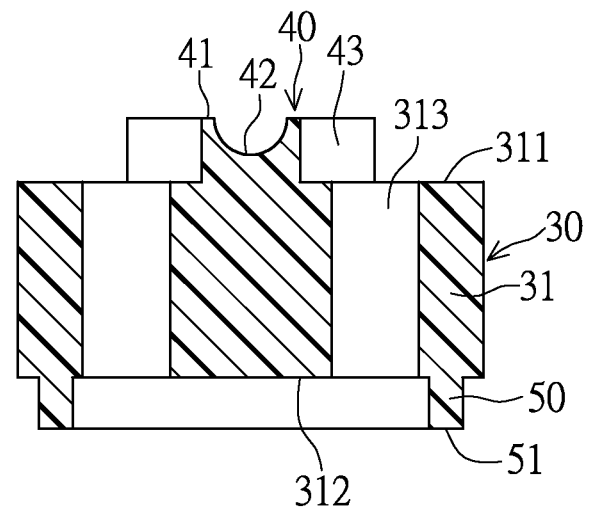
FIG. 5 is a side cross-sectional view of the sealing element in accordance with the first embodiment of the instant disclosure.
Figure 6:
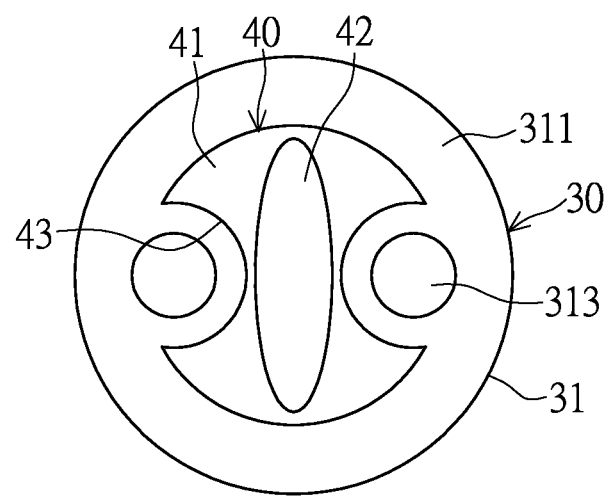
FIG. 6 is a top view of the sealing element in accordance with the first embodiment of the instant disclosure.

Please refer to FIGS. 4 and 5 for the sealing member 30 of the instant disclosure. The second surface 312 of the cover body 31 has the interior convex portion 50 formed thereon. The interior convex portion 50 is an annular rib in the instant embodiment that extends from the second surface 312 and towards a direction away from the second surface 312. The interior convex portion 50 is formed with at least one second abutting surface 51 on the apex thereof. As shown in FIG. 2, when the sealing member 30 is installed on at the open end 11 of the capacitor casing 10, the second abutting surface 51 is in contact with portions of the surface of the corresponding capacitor element 20, so that a gap is maintained between the capacitor element 20 and the second surface 312 of the cover body 31 to separate the two from contact.

The sealing member 30 of the instant disclosure, via the function of the interior convex portion 50, facilitates a gap to be maintained between the capacitor element 20 and the sealing member 30, so that the capacitor element 20 has room for thermal expansion in order to prevent the capacitor element 20 and the sealing member from being stressed due to pressure and further prevent the insulation layer of the anode foil and cathode foil in the capacitor element 20 from damage due to deformation caused by stress. Meanwhile, the second abutting surface 51 of the interior convex portion 50 provides physical interference by reducing the swaying of the capacitor element 20 inside the capacitor casing 10 in order to maintain stable electrical properties for the capacitor element 20.

With the physical interference between the interior convex portion 50 and the capacitor element 20, shock experienced by the capacitor element 20 during operation can be reduced and loosening of the wound structure of the capacitor element 20 under prolonged shock can be reduced, all of which can affect the voltage and current of the capacitor.

[Second Embodiment]

Figure 8:
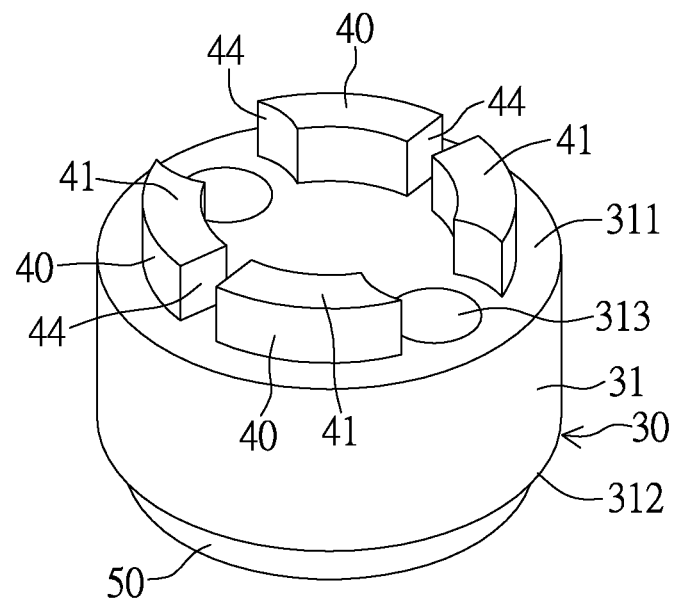
FIG. 8 is a perspective view of the sealing element in accordance with a second embodiment of the instant disclosure.

As shown in FIG. 8 as the second embodiment of the instant disclosure, the sealing member 30 has a plurality of exterior convex portion 40 arranged on the first surface 311 of the cover body 31. In the instant embodiment, the exterior convex portion 40 is defined as the plurality of protrusions protruding from the first surface 311 of the cover body 31. The protrusions extend from the first surface 311 and towards a direction away from the first surface 311. Each protrusion has the first abutting surface 41 arranged on the apex thereof. As shown in FIG. 8, each protrusion of the exterior convex portion 40 is spaced apart from another protrusion by a gap 44 so that none of the protrusions are connected to one another.

Each exterior convex portion 40 of the instant embodiment is separated by a gap 44 from another exterior convex portion 40, and each gap 44 that is arranged between two adjacent exterior convex portions 40 is a recessed space, so that any two adjacent exterior convex portions 40 do not interfere physically with one another and each exterior convex portion 40 has relatively large potential for elastic deformation. The recessed space that is formed by the gaps 44 is established as the expansion space of the exterior convex portion 40. In the instant embodiment, the two terminals 21 are accommodated between the gap 44 of two exterior convex portions 40, so that the side surface of each exterior convex portion 40 and the terminal 21 are spaced apart to provide room for air flow of gases generated during soldering or welding, and in turn enhancing the quality of soldering.

[Third Embodiment]

Figure 9:
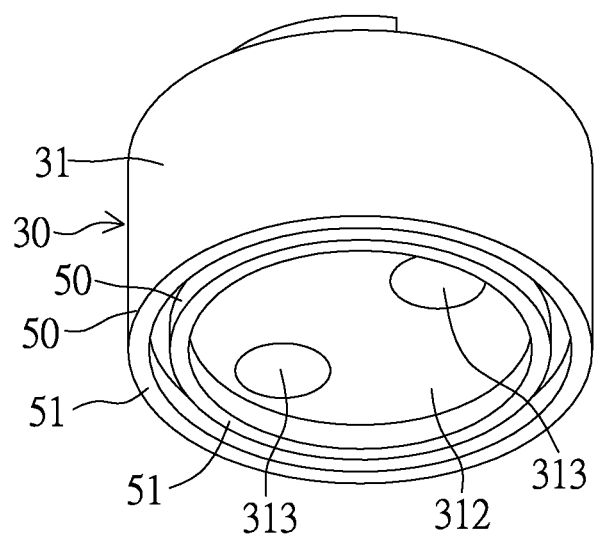
FIG. 9 is a perspective view of the sealing element in accordance with a third embodiment of the instant disclosure.

FIG. 9 illustrates the third embodiment of the instant disclosure. The third embodiment is a modification of the sealing element 30 as disclosed in the first embodiment. The cover body 31 of the instant disclosure has two annularly shaped ribs arranged on the second surface. The two annular ribs make up the two interior convex portions 50, and the two interior convex portions 50 extend from the second surface 312 and towards a direction away from the second surface 312. Each interior convex portion 50 has a second abutting surface 51 arranged on an apex thereof, and the second abutting surface 51 is partially in contact with the outer surface of the capacitor element 20.

Notably in the embodiment, the quantity of interior convex portions 50 that are arranged on the second surface of the cover body 31 of the sealing member 30 is not limited to one, and can be increased as required.

[Fourth Embodiment]

Figure 10:
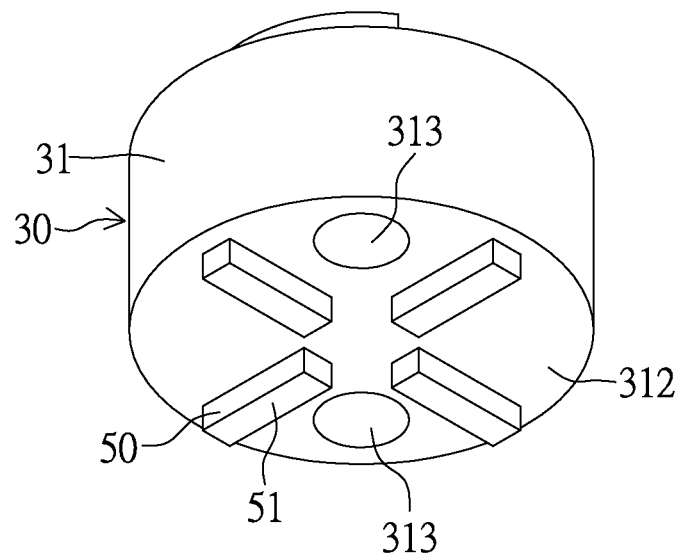
FIG. 10 is a perspective view of the sealing element in accordance with a fourth embodiment of the instant disclosure.

FIG. 10 illustrates the fourth embodiment. In the instant embodiment, the interior convex portion 50 on the sealing member 30 includes a plurality of elongated ribs. Each elongated rib extends from the second surface 312 and towards a direction away from the second surface 312. The elongated ribs are radially arranged on the second surface 312 of the cover body 31. Each interior convex portion 50 has a second abutting surface 51 arranged on an apex thereof, and the abutting surfaces are partially in contact with the outer surface of the corresponding capacitor element.

Notably in the instant embodiment, the shape of interior convex portions 50 that are arranged on the second surface of the cover body 31 of the sealing member 30 is not limited only to an annular shape but can be other shapes as required.

[Fifth Embodiment]

Figure 11:
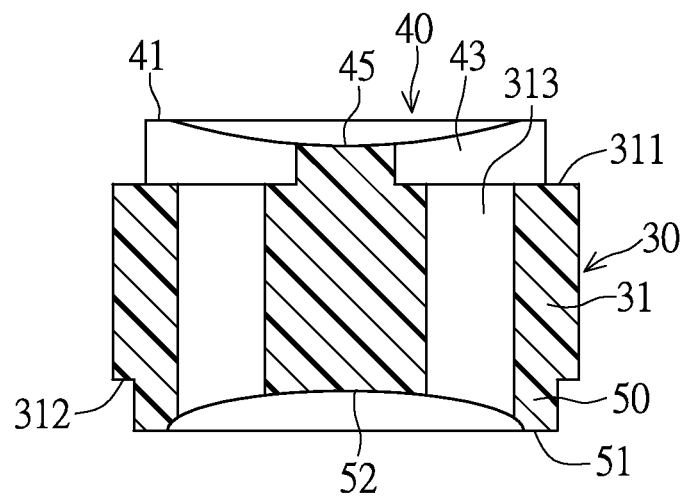
FIG. 11 is a side cross-sectional view of the sealing element in accordance with a fifth embodiment of the instant disclosure.
Figure 12:
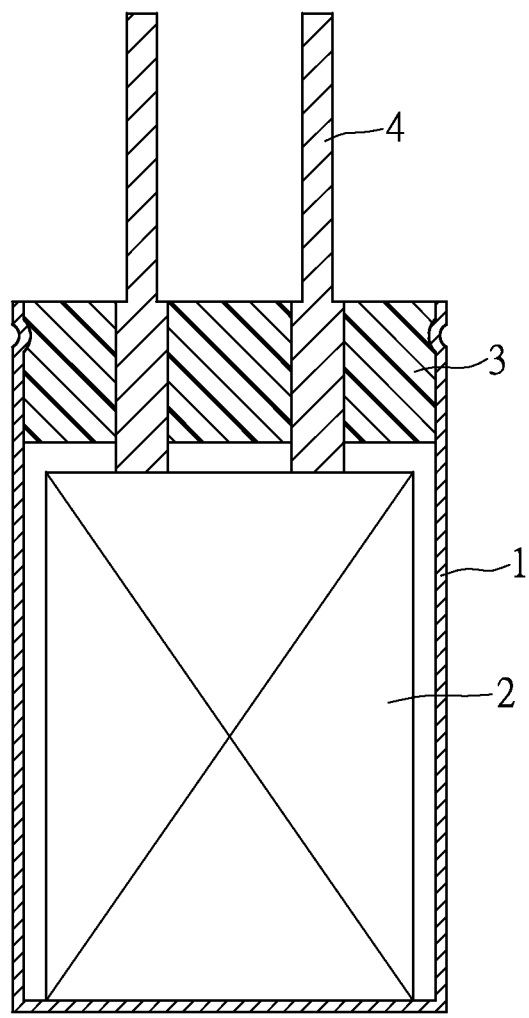
FIG. 12 is a cross-sectional view illustrating a conventional assembled wound-type electrolytic capacitor.

FIG. 11 illustrates the fifth embodiment of the instant disclosure. In the instant embodiment, the sealing member 30 has an exterior convex portion 40 arranged on the first surface 311, and an interior convex portion 50 arranged on the second surface 312.

The exterior convex portion 40 has a first abutting surface 41. The first abutting surface 41 has a first exterior concave surface 45 arranged thereon that forms the expansion space. The interior convex portion 50 also has an interior concave surface 52 arranged on the center of the second abutting surface 51, and the interior concave surface 52 is concaved from the second abutting surface 51 of the interior convex portion 50 towards a direction of the second surface 312 of the cover body 30, so that the center of the interior convex portion 50 has the interior concave surface 52 concavingly formed thereon and the peripheral portion of the interior concave surface 52 has the morphology of the second abutting surface 51.

[Possible Functions of the Embodiments]

In summary, the instant disclosure provides the following improvements. The sealing member 30 of the instant disclosure, via the exterior convex portion 40 that is arranged on the first surface 311 of the cover body 31, can prevent the first surface 311 of the sealing element 30 from making contact with the outer surface of the circuit board 60 when the wound-type solid state electrolytic capacitor is being installed on the circuit board 60. At the same time, the expansion space 42 of the exterior convex portion 40 can absorb the stress applied on the sealing member 30 during soldering, preventing the sealing member 30 from compressing the circuit board 60 during soldering that can damage the substrate or the capacitor.

Moreover, the sealing member 30 of the instant disclosure has the notch 43 or gap 44 arranged at the exterior convex portion 40, so that the exterior convex portion 40, the circuit board, and two terminals 21 of the capacitor are spaced apart. The space provides room for air flow of gases generated during soldering at the terminals 21, thus reducing soldering defects, and in turn enhance soldering quality.

In addition, the sealing member 30 of the instant disclosure has the interior convex portion 50 arranged on the second surface of the cover body 31, through which the second abutting surface 51 of the interior convex portion 50 partially contacts the outer surface of the capacitor element 20, so that the capacitor element 20 and the second surface of the sealing element 30 are spaced apart by a gap as the capacitor element 20 is physically interfaced with, and in turn the capacitor casing 10 is less susceptible to shock. As a result, stress damage due to thermal deformation on the insulating layer can be prevented when the capacitor element is thermally deformed, and stability of the electrical characteristic of the capacitor element 20 can be improved.

The figures and descriptions supra set forth illustrate the preferred embodiments of the instant disclosure; however, the characteristics of the instant disclosure are by no means restricted thereto. All changes, alterations, combinations or modifications conveniently considered by those skilled in the art are deemed to be encompassed within the scope of the instant disclosure delineated by the following claims.

What is claimed is:

1. A sealing element disposed at an open end of a capacitor casing and forming a hermetic seal with the capacitor casing in order to retain a capacitor element in the capacitor casing, comprising:

a cover body having a first surface exposed from the capacitor casing and a second surface oppositely arranged from the capacitor element, the cover body having a pair of terminal holes arranged thereon, the pair of terminal holes extending through the first surface and the second surface, and each terminal hole receiving a terminal of the capacitor element;

an exterior convex portion arranged on the first surface of the cover body, the exterior convex portion protruding from the first surface of the cover body and having a first abutting surface arranged at an apex thereof, and at least one slot being formed on the first abutting surface and the at least one slot being surrounded by the first abutting surface; and an interior convex portion arranged on the second surface of the cover body to interface with the capacitor element, the interior convex portion having a second abutting surface arranged at an apex thereof; wherein the second abutting surface is partially in contact with a surface of the corresponding capacitor element;

wherein the terminal has a first portion located in the terminal hole, a second portion located in a circuit board, and a third portion connected between the first portion and the second portion, and the first abutting surface of the exterior convex portion is abutted against an outer surface of the circuit board for exposing the third portion of the terminal from the terminal hole and the circuit board and separating the open end of the capacitor casing from the circuit board;

wherein the exterior convex portion is arranged between the two terminal holes, the at least one slot formed on the first abutting surface of the exterior convex portion defines an expansion space, two lateral portions of the exterior convex portion each having a notch arranged thereon to maintain a gap between the two lateral portions of the exterior convex portion and the two terminal holes; and wherein the exterior convex portion is made of elastic materials such that when the capacitor is being soldered and a pressure is being built up inside the capacitor casing, the exterior convex portion can be deformed because of the at least one slot formed on the first abutting surface thereof to thus absorb the pressure built-up inside the capacitor casing.

2. The sealing element as recited in claim 1, wherein the exterior convex portion is defined by a plurality of protrusions, the protrusions extend from and towards a direction away from the first surface; wherein the first abutting surface is arranged at an apex of each protrusion, and the expansion space is defined between every two adjacent protrusions.

3. The sealing element as recited in claim 1, wherein the interior convex portion further includes at least one annular rib or elongated rib, the annular rib or elongated rib extends from and towards a direction away from the second surface, and the annular rib or elongated rib is arranged around the terminal holes.

4. The sealing element as recited in claim 1, wherein the second abutting surface of the interior convex portion has a concavity arranged thereon, and the concavity is recessed from the second abutting surface towards the second surface of the cover body.

5. A wound-type solid state electrolytic capacitor, comprising:
   a capacitor casing having an open end;
   a capacitor element disposed in the capacitor casing, the capacitor element having two terminals; and
   a sealing element arranged at the open end of the capacitor casing and forming a hermetic seal with the capacitor casing, the sealing element comprising:
   a cover body having a first surface exposed from the capacitor casing and a second surface oppositely arranged from the capacitor element, and the cover body having a pair of terminal holes arranged thereon, the pair of holes extending through the first surface and the second surface, and each terminal hole receiving the corresponding terminal of the capacitor element;
   an exterior convex portion arranged on the first surface of the cover body, and the exterior convex portion protruding from the first surface of the cover body and having a first abutting surface arranged at an apex thereof, and at least one slot being formed on the first abutting surface and the at least one slot being surrounded by the first abutting surface; and
   an interior convex portion arranged on the second surface of the cover body to interface with the capacitor element, and the interior convex portion having a second abutting surface arranged at an apex thereof; wherein the second abutting surface is partially in contact with a surface of the corresponding capacitor element;
   wherein the terminal has a first portion located in the terminal hole, a second portion located in a circuit board, and a third portion connected between the first portion and the second portion, and the first abutting surface of the exterior convex portion is abutted against an outer surface of the circuit board for exposing the third portion of the terminal from the terminal hole and the circuit board and separating the open end of the capacitor casing from the circuit board;
   wherein the exterior convex portion is arranged between the two terminal holes, the at least one slot formed on the first abutting surface of the exterior convex portion defines an expansion space, two lateral portions of the exterior convex portion each having a notch arranged thereon to maintain a gap between the two lateral portions of the exterior convex portion and the two terminal holes; and
   wherein the exterior convex portion is made of elastic materials such that when the capacitor is being soldered and a pressure is being built up inside the capacitor casing, the exterior convex portion can be deformed because of the at least one slot formed on the first abutting surface thereof to thus absorb the pressure built-up inside the capacitor casing.

6. The wound-type solid state electrolytic capacitor as recited in claim 5, wherein the exterior convex portion is defined by a plurality of protrusions, the protrusions extend from and towards a direction away from the first surface;
   wherein the first abutting surface is arranged at an apex of each protrusion, and the expansion space is defined between every two adjacent protrusions.

7. The wound-type solid state electrolytic capacitor as recited in claim 5, wherein the interior convex portion further includes at least one annular rib or elongated rib, the annular rib or elongated rib extends from and towards a direction away from the second surface, and the annular rib or elongated rib is arranged around the terminal holes.

8. The wound-type solid state electrolytic capacitor as recited in claim 5, wherein the second abutting surface of the interior convex portion has a concavity arranged thereon, and the concavity is recessed from the second abutting surface towards the second surface of the cover body.

* * * * *